Figure 1:
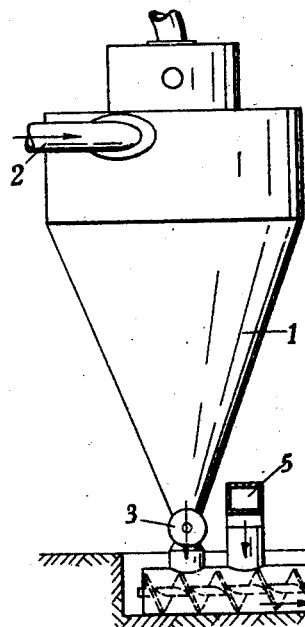
Figure 1:
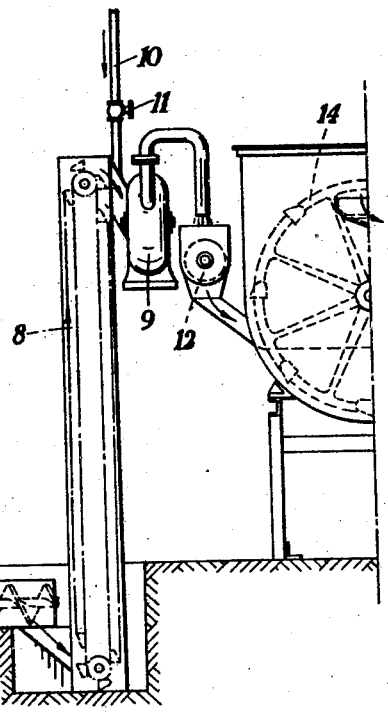

Feb. 10, 1948. J. A. CANN 2,435,646
PROCESS AND APPARATUS FOR THE MANUFACTURE OF ASBESTOS-CEMENT PRODUCTS
Filed May 23, 1941 3 Sheets-Sheet 1

INVENTOR.
John Arthur Cann
BY
Edwards, Bruce Pool
ATTORNEY.

Patented Feb. 10, 1948

2,435,646

UNITED STATES PATENT OFFICE 2,435,646

PROCESS AND APPARATUS FOR THE MANUFACTURE OF ASBESTOS-CEMENT PRODUCTS

John Arthur Cann, Bickley, England, assignor to Turner & Newall Limited, Spotland, Rochdale, England, a British company Application May 23, 1941, Serial No. 394,905
In Great Britain May 27, 1940

7 Claims. (Cl. 92—66)

This invention relates to processes in which a mixture of fibrous material and a binding agent that sets rigid from a plastic state is built up in layers on a rotary cylinder. The invention is primarily applicable to the manufacture of asbestos-cement products and in the first instance will be described in connection with these.

At the present time asbestos-cement products are practically universally made by a process which was an adaptation of that used for making millboard. This process was and is satisfactory for making boards of practically pure fiber without any hydraulic binding agents, but it is not wholly satisfactory for the manufacture of asbestos-cement, although enormous quantities of asbestos-cement products are made by it. Essentially, in the existing process asbestos and cement are mixed and beaten with a large proportion of water to form a thin slurry, which is then agitated in a container known as a "stuff chest." This constitutes a reservoir from which supplies of slurry are taken to one or more vats in each of which a sieve cylinder rotates. Each of these cylinders picks up the slurry as a continuous, thin layer, excess water draining through the meshes of the sieve, and the layer is transferred to a continuous conveyor web by which it is carried to a rotating cylinder to which it is in turn transferred. The coating on the cylinder builds up layer by layer until the required thickness is reached. If a flat sheet is being made, the layered product on the cylinder (which is then usually known as a forming roll) is cut axially when it has reached the required thickness, and if a pipe is being made, the layered product is removed in the form of a tube from the cylinder, which is then usually known as a mandrel.

The properties of hydraulic binding agents, and particularly Portland cement, are such that it is very undesirable to use large quantities of water, as even a small excess lowers the strength of the finished product. Moreover, the time factor in mixing is important, and as the cement is added in the beater or mixer and agitated for a long period in the stuff chest and vats the product is much weakened. Further, the agitation with water causes each particle of cement to hydrate and become coated with a jelly-like film. This excessive agitation may cause the particles to become completely hydrated if the mixing is unduly prolonged. The sieves are of such a coarse mesh that cement particles can pass through, and it is only the fact that the asbestos fibers form a filtering layer on the sieve that prevents all the cement from passing through. Even so, the water passing through the sieves carries some of the cement with it and causes the film on the cylinder to include a layer (next to the sieve) containing less cement than the remainder.

In addition to the disadvantages referred to above, much water is used, and both the amount consumed and the plant necessary to circulate it are substantial items in the cost of manufacture. The sieves and vats are expensive to make and maintain; moreover, constant control of them is necessary if the product is to be uniform. Further, the axial length of a sieve is limited, so that it is not easy to make pipes in long lengths, such as 14 feet.

The principal object of the present invention is to provide an entirely new method of forming an asbestos-cement mixture and applying it to a conveyor web.

Another object is to provide a process by which asbestos-cement products, and particularly pipes, may be made stronger than is possible with the existing processes.

A further object of the invention is to control the time during which the cement and water are in contact before the mixture is applied to the conveyor web.

Yet another object is to provide a new and improved plant for use in the manufacture of asbestos-cement products.

Many other objects will appear as the description proceeds.

An important idea forming part of the invention is to use a mixture having about the consistency of thick cream, and to feed this onto the upper surface of a conveyor web. The creamy mixture can be applied evenly over a wide conveyor web by means of an appropriate feeding device. The amount of water required is much reduced and the usual rotary sieves with their vats can be abolished altogether. Moreover, the products are stronger than those made by any known dry or wet process.

As a rule the ratio of asbestos to cement is 12.5:87.5, although, of course, this ratio may vary widely in accordance with the properties desired in the product. I find that the desired creamy consistency can be obtained if the ratio of the water to the total dry materials is as low as 4:3, but it may be as high as 20:3; preferably it lies between 6:3 and 8:3. This gives a proportion of water in the range between 1.33 to 6.66, and preferably between 2 and 2.66. It is, of course, essential that the mixture should flow sufficiently easily to run onto the conveyor and form a uniform thin layer there, and it should not be more dilute than is necessary, because otherwise some of the saving of water is lost and the products are weaker.

If the mixture is thick, having a ratio of water to dry materials of, say, 3:1 or less, it is desirable to subject it to vibration to cause it to form a uniform film.

I find it best to mix the asbestos and cement dry, and to add substantially no more water than is required to make the cement particles swell enough for the whole mixture to flow.

It is highly desirable that the average time of contact between the water and the cement before the mixture forms a layer on the rotary cylinder should be short, i. e. from 10 to 15 minutes. As it takes some time to form the creamy mixture, the feeding onto the conveyor web should take place directly after the mixture is formed. The mixing period is thus very important, as insufficient hydration gives a dry brittle layer which will not bond readily to succeeding layers, whereas too much swelling of the cement particles gives a slimy sheet which shows shrinkage and weakness after setting.

As a rule, the conveyor web (which may be of any appropriate woven fabric or metal gauze) is stopped when enough layers have been applied to the rotary cylinders and the product is being removed from the machine. If this is done, the feeding of the creamy mixture should also be stopped, and in my invention I provide means for doing this, i. e. I feed the mixture onto the conveyor web (as distinguished from causing the web to pick up a mixture) and stop the feed whenever the web is stopped.

Figure 2:
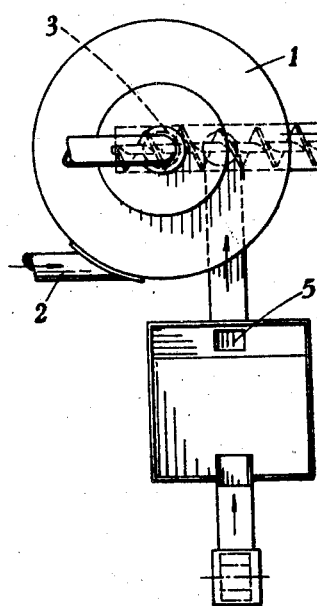
Figure 2:
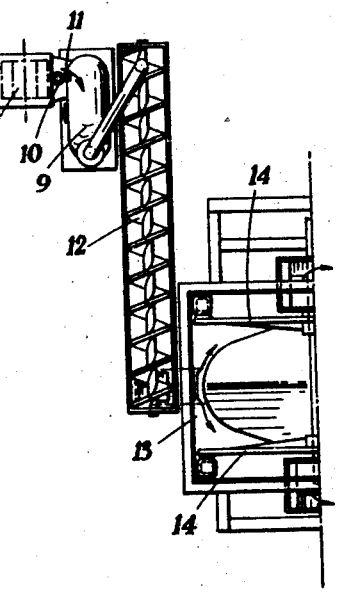
Figure 1A:
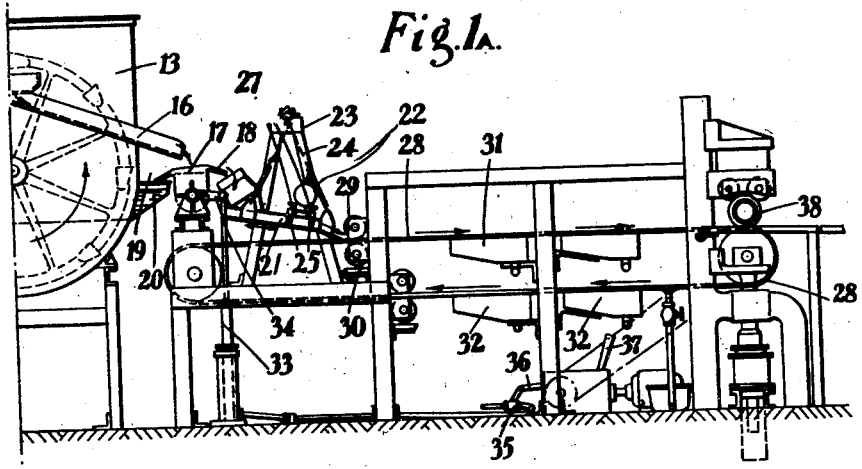
Figure 2A:
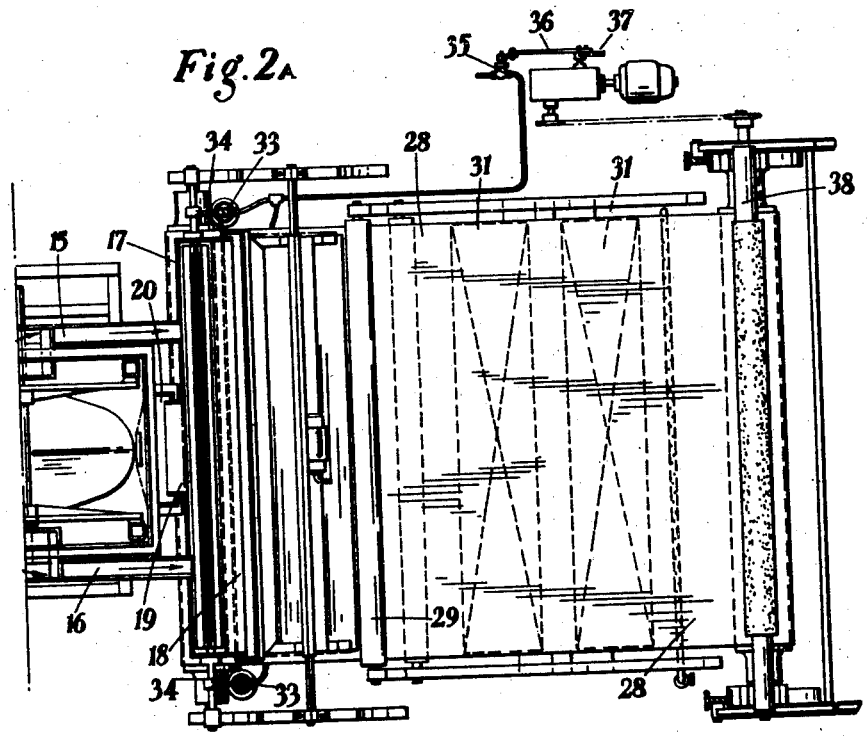
Figure 3:
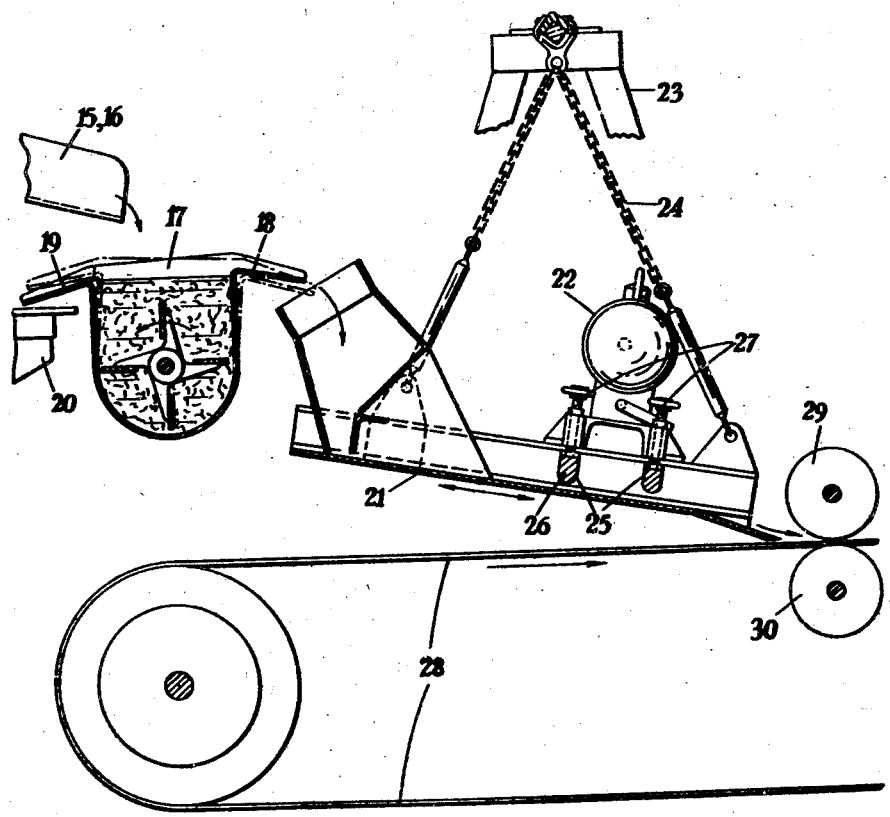

In order that my invention may be more clearly understood, the first part of one plant for the production of asbestos-cement products will now be described by way of example with reference to the accompanying drawings, in which:

Figure 1 is an elevation, and Figure 2 a plan of this part of the plant and Figs. 1a and 2a are elevation and plan respectively of a portion of the plant forming a continuation of the part shown in Figs. 1 and 2; and Figure 3 shows one part to a larger scale.

The asbestos is first weighed and opened in apparatus of standard type (not shown) and then delivered into a cyclone 1 through an inlet 2. It leaves the cyclone at the bottom through an outlet 3 which communicates with a worm conveyor 4. The cement is fed through a hopper 5 into the same conveyor 4 and thorough mixing of the dry materials is effected in this conveyor. At the end of the conveyor the dry mixture is elevated by means of an endless bucket chain 8 and is delivered into a rotary mill 9 into which water is also delivered through a pipe 10 controlled by a valve 11. The dry materials and water are intimately and rapidly mixed in this mill, and they then pass into a horizontal worm conveyor and mixer 12. This serves the double purpose of further mixing all the materials and ensuring that the average time during which any particle of cement is in contact with water before the film is formed on the conveyor web is controlled. As an example of the times taken, the asbestos and cement may take about fifteen minutes to pass through the conveyor 4, and the asbestos-cement and water may be in contact with one another while being mixed in the mill 9 and conveyor 12 for about ten minutes. From the conveyor 12 the mixture, which is now of creamy consistency, passes into an agitating container 13, which is described in detail in Letters Patent No. 2,295,258, granted September 8, 1942, and which contains two bucket wheels 14 working in troughs in the bottom of the container. This container 13 acts also as a reservoir. The creamy mixture is picked up by the bucket wheels and delivered into troughs 15 and 16 down which it flows into a distributing container 17, which is also described in detail in Letters Patent No. 2,295,258. The agitating container 13 serves to distribute the mixture laterally to some extent, that is to say, the mixture having entered the container 13 in a narrow stream passes out from it in two streams spaced apart. The distributing container 17 is mounted to rock about a horizontal axis, and its forward and rearward edges form weirs 18 and 19 over which the mixture can flow. When the whole machine is running normally, more mixture is supplied to the container 17 than is required, with the result that some of it flows over the forward weir 18 in a substantially uniform stream and the remainder flows back over the weir 19 into a trough 20 by which it is returned to the agitating container 13. The average time that it takes any particle of the mixture to pass from the inlet of the container 13 to the weir 18 is a fraction of a minute.

The mixture flowing over the weir 18 runs into a pan 21. The plant described is intended to be able to form and supply a mixture having a low ratio of water to total dry materials, so the pan is mounted to vibrate as a whole and is vibrated by means of an electric vibrating device 22, of the type which has an out-of-balance armature spindle. The pan 21 is carried by chains 24 from a frame 23. Two regulating gates or doctors 25 are provided in the pan 21 with their lower edges spaced from the surface of the pan to an extent which is just equal to the thickness of the film required on the conveyor web in the actual asbestos-cement making machine and they have curved faces 26. These gates 25 can be adjusted in position by means of screw mechanisms 27. From the pan 21 the mixture, now in a very thin layer substantially uniform in thickness, passes on to the upper surface of the upper run of the conveyor web 28. This web passes between two rollers 29 and 30. The upper roller 29 serves to smooth the layer on the web and increase the uniformity of its thickness. The distance between the two rollers may be adjusted by mounting their bearings appropriately so that the thickness of the thin layer or film on the conveyor web may be varied. If a thick mixture is used, it may be desirable to vibrate the upper roller 29.

In the preferred mixture the water content in the layer on the conveyor web is about twice that of the dry materials, and before the mixture is carried by the web to the rotary cylinder 38 on which the products are formed the water content should be reduced to about one-third, i. e. from 200% to 30%. To effect this reduction the web 28 passes over vacuum boxes 31 in the usual way. On its return run from the rotary cylinder on which the products are formed the web is thoroughly washed by water jets and then passes over vacuum boxes 32 so as to be as dry and clean as possible when fresh mixture is applied to it.

Whenever a product has been built up to a sufficient thickness on the rotary cylinder, the conveyor web 28 must be stopped. The feed of fresh mixture is stopped at the same time by tilting the distributing container 17 by means of hydraulic rams 33 which are connected to levers 34 fixed to the container 17. The supply of water under pressure to this ram is controlled by a valve 35, which is mechanically connected by linkage 36 to a lever 37 through which the web 28 is started and stopped. Thus, when the web is stopped, the container 17 is rocked so that instead of some of the mixture flowing over the forward weir 18 all the mixture flowing into the container 17 flows back over the rearward weir 19.

It is best for the mixture to be somewhat above room temperature, say at 70° F., and therefore the water may be warmed before it is added to the mill 9.

It will be seen that the time during which on the average any particle of cement is in contact with water before it becomes part of a layer on the rotary cylinder is strictly controlled. This is very important, as it allows the maximum strength to be developed. Moreover, not only is the average time so controlled, but by the use of the plant described the time for each particle is made to deviate very little from the average. This desirable result is attained particularly by the use of mixers of the worm conveyor type, as this type of mixer clears itself completely and the time taken for each particle to pass through it is substantially constant. It works continuously and the mixing is very thorough.

The use of a thick creamy mixture makes it possible to modify the process and products in various ways with advantage. Thus, any desired aggregate, for instance gritty material, can be added with ease, whereas in the normal process this is difficult because coarse particles tend to settle out of the mixture and there is a risk of damage to the wires of the sieve cylinders. Again, laminated products having layers differing in composition can easily be made, and a surface coating of any desirable colour can be added to the layer on the felt and this colouring can be confined to the surface which will be exposed. Such a colouring layer, or any other layer, may be applied in the dry state.

Moreover, in the process of the invention the thickness of the layer can be controlled at will, whereas when sieve cylinders are used the thickness is limited, first by the amount that can be picked up by the sieve, i. e. the amount which can be drained by the sieve mesh to be firm enough to remain on the sieve cylinder as it leaves the surface of the mixture in the vat, and secondly by the amount which will be picked up by the felt while it is facing downwards, i. e. in the position in which it makes contact with the surface of the sieve cylinder.

The invention is of particular value in the manufacture of pipes. Not only is the increased strength particularly important in a pipe, but also it is desirable that the layered product on the mandrel should be somewhat slippery, so that it will be readily loosened from the mandrel, and this result is achieved by ensuring that the silica in the cement is in the proper gelled condition.

As indicated above, the invention is not restricted to the manufacture of asbestos-cement. In the first place, the asbestos may be replaced wholly or partly by any equivalent fibrous material, and the cement may be replaced wholly or partly by any equivalent hydraulic binding agent. However, wider departures may be made within the scope of the invention.

I claim:

1. A method of forming a laminated fiber-cement product comprising mixing fibers, a hydraulic binding agent and water to provide a wetted fiber-cement material of predetermined composition and creamy consistency with the proportion of water in the range between 1.33 and 6.66, forming the said creamy mixture into a continuous stream, reducing said stream to an even thin film and carrying said film forward on a continuous travelling surface, subjecting the film on said surface to a suction action thereby withdrawing most of the water to correspondingly reduce the proportion thereof in the film, subsequently progressively picking up said film from said surface by a rotary member and continuing the winding of said film on said member to accumulate successive layers of said film in face to face contact to form a laminated body of desired thickness, and stripping said resultant body from said rotary member.

2. A method of forming a laminated fiber-cement product as set forth in claim 1 in which the wetted fiber-cement material has a proportion of water in the range between 2 and 2.66.

3. A method of forming a laminated fiber-cement product as set forth in claim 1 in which the wetted fiber-cement stream is subjected to vibration to cause it to become uniform in thickness.

4. A method of forming a laminated fiber-cement product as set forth in claim 1 in which both the stream and film are subjected to vibration to cause them to be uniform in thickness.

5. A method of forming a laminated fiber-cement product as set forth in claim 1 in which the suction action on the film reduces the water content to about 30%.

6. In apparatus for forming a laminated fiber-cement product the combination with means for flowing a creamy mixture of wetted fiber-cement in flat, stream form onto and along an inclined pan, means associated with said pan reducing the flowing stream to a uniform thin film flowing over the lower edge of said pan, an endless travelling belt receiving said uniform thin film directly from said pan, a suction device for drawing water from said film on said belt, and a rotary cylinder device picking said film from said belt and accumulating it in a series of laminations to desired thickness.

7. An apparatus for forming a laminated product of fiber-cement as set forth in claim 6 in which there are supporting means carrying the inclined pan and vibrating means carried by the pan to subject the pan to vibration to cause it to form a uniform film.

JOHN ARTHUR CANN.

REFERENCES CITED

The following references are of record in the file of this patent:

UNITED STATES PATENTS

| Number | Name | Date |
| --- | --- | --- |
| Re. 12,594 | Hatschek | Jan. 5, 1907 |
| Re. 18,626 | White | Oct. 18, 1932 |
| 837,718 | Perry | Dec. 4, 1906 |
| 1,199,683 | Ferla | Sept. 26, 1916 |
| 1,268,203 | Anderson | June 4, 1918 |
| 1,651,407 | Parker | Dec. 6, 1927 |
| 2,004,936 | Dorn et al. | June 18, 1935 |
| 2,102,004 | Hutchinson | Dec. 14, 1937 |
| 2,182,355 | Rembert et al. | Dec. 5, 1939 |
| 2,198,800 | Badollet | Apr. 30, 1940 |
| 2,252,991 | Steck | Aug. 18, 1941 |
| 2,295,258 | Cann | Sept. 8, 1942 |
| 2,369,608 | Salvaneschi | Feb. 13, 1945 |

FOREIGN PATENTS

| Number | Country | Date |
| --- | --- | --- |
| 6,918 | Great Britain | 1906 |
| 27,920 | Great Britain | 1907 |
| 20,485 | Great Britain | 1912 |
| 520,348 | Germany | Mar. 10, 1931 |